(12) United States Patent
Miyamoto

(10) Patent No.: US 7,276,821 B2
(45) Date of Patent: Oct. 2, 2007

(54) MOVING MAGNET TYPE LINEAR SLIDER

(75) Inventor: Yasuhiro Miyamoto, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 11/635,769

(22) Filed: Dec. 8, 2006

(65) Prior Publication Data

US 2007/0103008 A1    May 10, 2007

Related U.S. Application Data

(63) Continuation-in-part of application No. PCT/JP2005/008677, filed on May 12, 2005.

(30) Foreign Application Priority Data

Jun. 11, 2004    (JP)    ............................. 2004-173841

(51) Int. Cl.
    *H20K 41/00*    (2006.01)
(52) U.S. Cl. ............................. 310/12; 310/13; 310/15
(58) Field of Classification Search .................. 310/12, 310/13, 15
    See application file for complete search history.

(56) References Cited

U.S. PATENT DOCUMENTS 6,911,747 B2 *  6/2005  Tsuboi et al. .................. 310/12
6,917,126 B2 *  7/2005  Tsuboi et al. .................. 310/12
6,952,086 B1 * 10/2005  Krefta et al. ................. 318/135

* cited by examiner

*Primary Examiner*—Darren Schuberg
*Assistant Examiner*—Iraj A. Mohandesi
(74) *Attorney, Agent, or Firm*—Westerman, Hattori, Daniels & Adrian, LLP.

(57) ABSTRACT

In some embodiments, a moving magnet type linear slider capable of minimizing the effect of microvibration at the time of driving a linear motor, easily increasing the servo gain and suppressing the speed ripple is provided. The moving magnet type linear slider includes a linear motor for reciprocating a table, and a detector for detecting the relative position of the table and a fixed base. The linear motor includes an armature in which polyphase armature winding is wound around the armature core secured to a fixed base and a field permanent magnet secured to the lower surface of the table in the vertical direction and arranged between the inner side surface of the linear guide and the outside surface of the armature via gaps therebetween. The detector includes a linear scale secured to the lower surface side of the table and a sensor head secured to the upper surface side of the armature, and the central axis of the detector is substantially aligned with the thrust central axis G-G of the armature.

18 Claims, 7 Drawing Sheets

MOVING MAGNET TYPE LINEAR SLIDER

RELATED APPLICATIONS

This application is a continuation-in-part of an International Patent Application No. PCT/JP2005/008677, filed on May 12, 2005. This application claims priority under 35 U.S.C. §119 to Japanese Patent Application No. 2004-173841 filed on Jun. 11, 2004. Each of the entire disclosures of these applications is incorporated herein by reference in its entirety.

BACKGROUND OF THE INVENTION

1. Field of the Invention

The present invention relates to a linear motor for use in various industrial machinery, such as, e.g., electrical component mounting apparatuses, semiconductor related apparatuses, or machine tools, and suitably used for driving the direct acting mechanism thereof, and more specifically to a moving magnet type linear slider of a suction force offset type equipped with a field permanent magnet as a moving unit and an armature having an armature winding as a stator.

2. Description of Related Art

The following description sets forth the inventor's knowledge of related art and problems therein and should not be construed as an admission of knowledge in the prior art.

FIGS. 6 and 7 show a conventionally available moving magnet type linear slider for use in various industrial machinery, such as, e.g., electrical component mounting apparatuses, semiconductor related apparatuses, or machine tools, and suitably used for driving the direct acting mechanism thereof. FIG. 6 is a plan view of a conventional moving magnet type linear slider, and FIG. 7 is a side view of the linear slider shown in FIG. 6.

In FIGS. 6 and 7, the reference numeral "31" denotes a fixed base, "32" denotes an armature, "33" denotes a table, "34" denotes a field permanent magnet, "35" denotes a linear scale, "36" denotes a sensor head, "37" denotes a slider, "38" denotes a guide rail, "39" denotes a stopper, "40" denotes a motor lead, "41" denotes a linear scale cable lead, "42" denotes a driver, and "43" denotes a sensor holder.

The fixed base 31 is provided with linear guides constituted by sliders 37 and guide rails 38 for movably supporting the right and left sides of the table 33 placed opposite to the fixed base 31 in parallel. Between the linear guides, armatures 32 fixed on the fixed base 31 and field permanent magnets 34 secured to the lower surface of the table 33 and placed opposite to the armatures 32 via a gap are disposed.

The linear scale 35 is secured to the side surface of the fixed base 31 and the sensor head 36 is secured to the side surface of the table 33 via a sensor holder 43 so as to face the linear scale 35 so that the relative position of the table 33 and the fixed base 31 can be detected.

In the conventional moving magnet type linear slider, since the sensor head 36 is secured to the table 33, the linear scale cable lead 41 is configured to move at the time of driving the table 3. When the liner slider is combined with a driver 42, the motor parameter is stored in an internal memory of the driver 42 (see, e.g., Japanese Unexamined Laid-open Patent Publication-No. H06-054516 (FIG. 1)).

In the conventional moving magnet type linear slider, however, since the linear scale 35 is arranged at the one side of the linear slider, the distance L between the thrust central axis G-G of the armature 32 and the central axis S-S at the attachment position of the linear scale 35 is long, causing minute vibrations of the linear scale due to the microvibration of a driven table 3 at the time of controlling the linear motor, which in turn causes such problems that, e.g., the servo gain cannot be increased or the speed ripple becomes large.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a moving magnet type linear slider capable of minimizing the effect of microvibration at the time of the driving, easily increasing the servo gain and suppressing the speed ripple.

According to a first aspect of the present invention, a moving magnet type linear slider, includes:

linear guides including sliders for movably supporting right and left sides of a table placed opposite to a fixed base in parallel and guide rails for guiding the sliders, a linear motor for reciprocating the table with respect to the fixed base on the guide rails along a longitudinal direction thereof, and a detector for detecting a relative position between the table and the fixed base. The linear motor includes armatures each having a polyphase armature winding wound around an armature core served as a magnetic circuit and secured to a center of the fixed base, and field permanent magnets each secured to a lower surface of the table in a vertical direction and arranged between an inner side surface of each of linear guides arranged at right and left sides of the table and an outer side surface of the armature via gaps, the linear motor being a suction force offset type. The detector includes a linear scale secured to a lower surface side of the table, and a sensor head secured to an upper surface side of the armature to detect the linear scale. A central axis of the detector constituted by the linear scale and the sensor head is substantially aligned with a thrust central axis of the armature.

According to this moving magnet type linear slider, since the linear scale is arranged on the thrust central axis of the linear motor, the effect of vibration to a sensor signal due to the effect of microvibration at the time of driving the table can be minimized, resulting in improved servo gain and suppressed speed ripple, which in turn can improve the positioning performance and the constant feeding performance of a device mounting the linear motor.

In the moving magnet type linear type slider described above, preferably, a magnetic pole detector for detecting a relative position of the armature and the field permanent magnet is arranged at one of side surface sides of the right and left linear guides, and a hall element constituting the magnetic pole detector is secured to the fixed base side and magnetic pole detector permanent magnets constituting the magnetic pole detector are secured to the table side with the same pitch as that of the field permanent magnets.

According to this moving magnet type linear slider, since the magnetic pole detector is provided, the relative position of the linear motor armature and the field permanent magnet can be detected immediately upon turning on the servo, resulting in simplified setup.

In the moving magnet type linear type slider described above, preferably, a magnetic pole detection signal detected by the hall element and a linear scale signal detected by the sensor head are introduced into the same serial converter so that both the signals are converted into a serial signal and transmitted to a driver.

According to this moving magnet type linear slider, since the magnetic pole detection signal and the linear scale signal are converted into a serial signal and transmitted to the driver, large-capacity transmission compared with a conventional pulse transmission can be achieved, which enables establishment of high-speed and high-resolution linear driving system.

In the moving magnet type linear type slider described above, preferably, the serial converter is built in the sensor head.

According to this moving magnet type linear slider, since the serial converter is built in the sensor head, miniaturization can be achieved.

In the moving magnet type linear type slider described above, preferably, a memory is provided at one of the sensor head and the serial converter, a motor parameter of the linear motor is inputted into the memory, and when the linear slider and the driver are connected, the motor parameter is also converted into a serial signal by the serial converter, and the serial signal is transmitted to the driver.

According to this moving magnet type linear slider, the motor parameter information, etc., is previously stored in the linear slider as a serial signal and stored in the linear slider and the motor parameter information is inputted in the driver side when connected to the driver. Therefore, even if the driver is broken and replaced with another one, the original state can be restored without delay.

In the moving magnet type linear type slider described above, preferably, an absolute-type encoder for detecting an absolute position signal of a movable unit of the linear motor is mounted in the linear scale.

According to this moving magnet type linear slider, by encoding the signal output of the linear scale into an absolute signal, a return-to-origin operation will not be required at the time of the power activation. Thus, the linear slider can be preferably used in applications such as machine tools in which a return-to-origin operation affects the processing accuracy from the view of the processing.

In the moving magnet type linear type slider described above, preferably, the fixed base is provided with an attachment hole for attaching the linear slider to an external device, the attachment hole being located outside or inside the guide rail.

According to this moving magnet type linear slider, by forming the attachment hole in a free space for a user, the slider width dimension can be decreased.

According to another aspect of the present invention, a moving magnet type linear slider, includes: a fixed base, a table arranged above the fixed base, a linear guide for slidably supporting the table, the linear guide including a slider secured to the table and a guide rail for guiding the slider, the guide rail being secured to the fixed base, a linear motor for reciprocating the table with respect to the fixed base on the guide rail along a longitudinal direction thereof, and a detector for detecting a relative position between the table and the fixed base. The linear motor includes armatures secured to a center of the fixed base and field permanent magnets secured to a lower surface of the table and arranged between the linear guide and the armature via gaps so as to offset a suction force thereof. The detector includes a linear scale secured to a lower surface side of the table and a sensor head secured to an upper surface side of the armature to detect the linear scale. A central axis of the detector is substantially aligned with a thrust central axis of the armature.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE INVENTION

In the following paragraphs, some preferred embodiments of the invention will be described by way of example and not limitation. It should be understood based on this disclosure that various other modifications can be made by those in the art based on these illustrated embodiments.

Hereafter, embodiments of the present invention will be explained with reference to the attached drawings.

Figure 1:
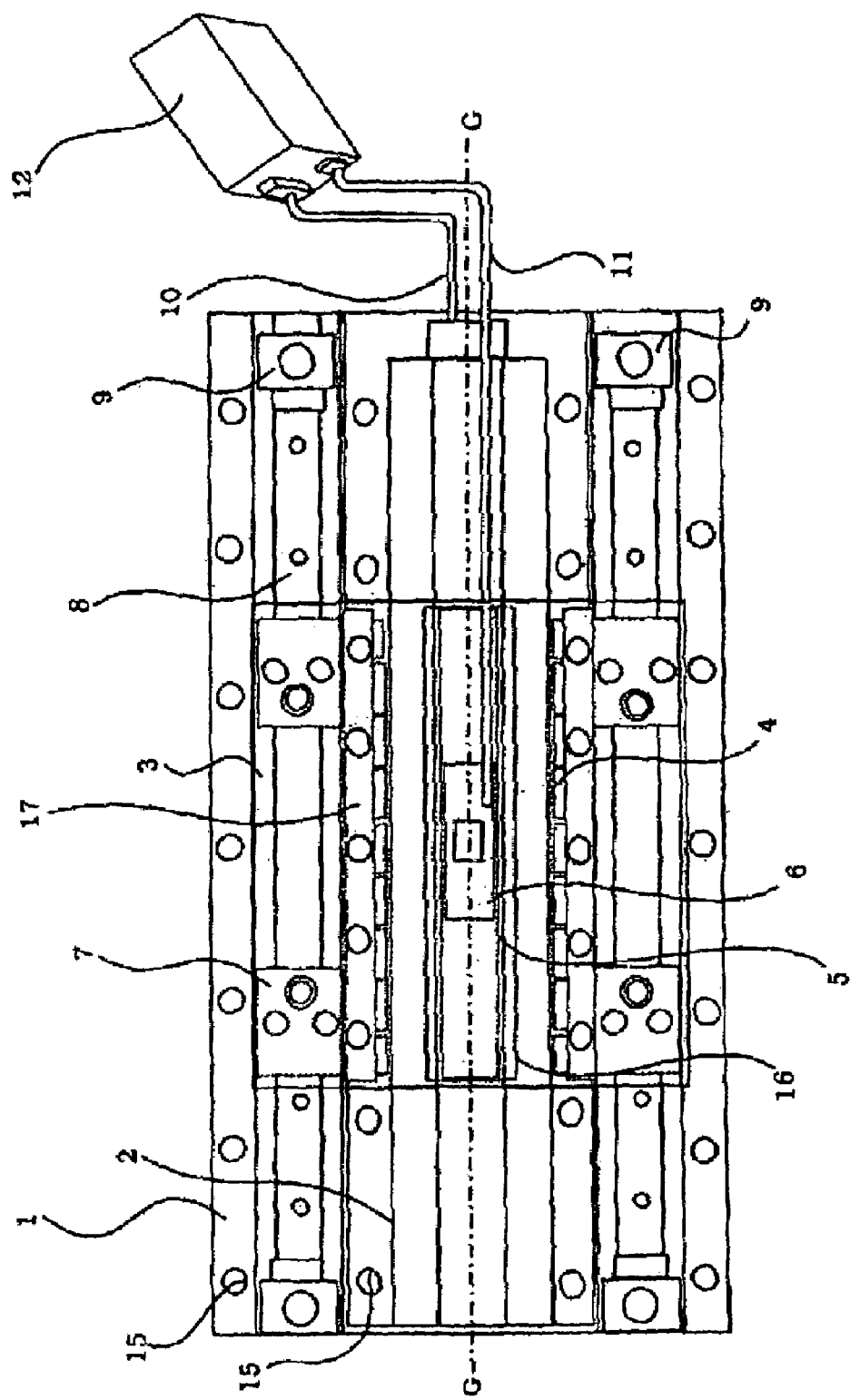
FIG. 1 is a plan view of a moving magnet type linear slider according to one embodiment of the present invention.
Figure 2:
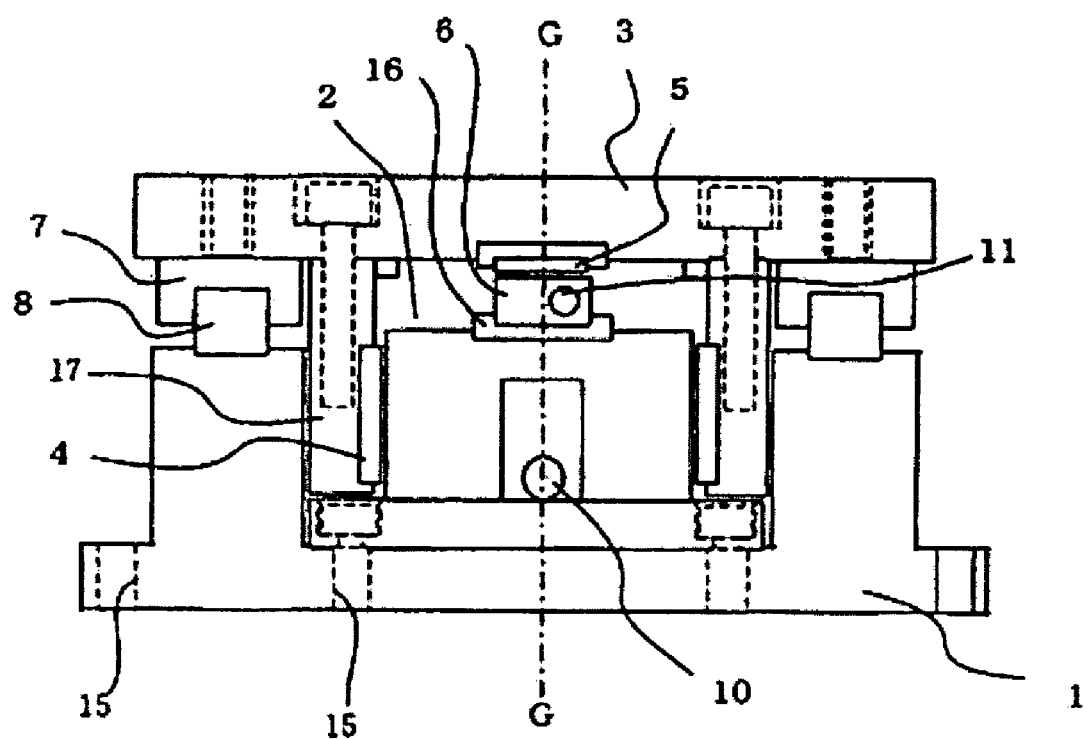
FIG. 2 is a side view of the linear slider shown in FIG. 1.

FIG. 1 is a plan view of a moving magnet type linear slider according to a one embodiment of the present invention, and FIG. 2 is a side view of the linear slider shown in FIG. 1.

In the drawings, the reference numeral "1" denotes a fixed base, "2" denotes an armature, "3" denotes a table, "4" denotes a field permanent magnet, "5" denotes a linear scale, "6" denotes a sensor head, "7" denotes a slider, "8" denotes a guide rail, "9" denotes a stopper, "10" denotes a motor lead, "11" denotes a linear scale cable lead, "12" denotes a driver, "15" denotes an attachment hole, "16" denotes a sensor holder, and "17" denotes a magnetic substance yoke.

The following explanation will be mainly directed to the feature of this embodiment.

This moving magnet type linear slider is provided with a fixed base 1, a table 3 arranged above the fixed base 1, linear guides each constituted by a slider 7 for slidably supporting the right or left side of the table 3 placed opposite to the fixed base 1 in parallel and a guide rail 8 for slidably guiding the slider 7, a linear motor for reciprocating the table 3 with respect to the fixed base 1 on the guide rails 8 along the longitudinal direction thereof, and a detector for detecting the relative position between the table 3 and the fixed base 1. The linear motor includes armatures 2 each having a polyphase armature winding wound around an armature core served as a magnetic circuit and secured to a center of the fixed base 1, and field permanent magnets 4 each secured to the lower inner surface of the magnetic substance yoke 17 downwardly extended from the table 3 and arranged between the inner side surface of each of linear guides arranged at right and left sides of the table 3 and the outer side surface of the armature 2 via gaps (this linear motor is configured to be a suction force offset type).

The detector includes a linear scale 5 secured to the lower surface side of the table 3, and the sensor head 6 secured to the upper surface side of the armature 2 to detect the linear scale 5. The central axis of the detector constituted by the linear scale 5 and the sensor head 6 is substantially aligned with a thrust central axis G-G of the armature 2 as shown in FIG. 2.

In this embodiment, two rows of parallel attachment holes 15, which will be used by a user to secure the linear slider 15 to a device, are formed in the fixed base 1 outside and inside the guide rail 8, respectively. As to the attachment holes 15 to be formed inside the guide rail 8, if these holes 15 are formed at a free space of the fixed base 1 between the armature 2 and the linear guide constituted by the slider 7 and the guide rail 8, the width dimension of the linear slider can be decreased.

At the stroke ends (front and rear ends of the linear guide) of this moving magnet type linear slider, a total of four stoppers 9 having a stopper function to prevent an overrun and a conveyance handle function are provided.

Figure 3A:
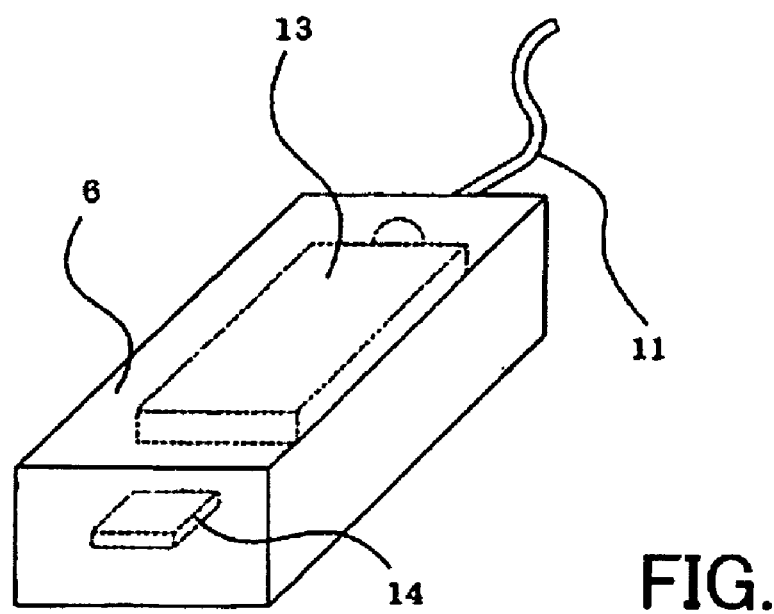
FIG. 3A is a perspective view of a sensor head for use in a linear scale signal processing circuit employed by the present invention.
Figure 3B:
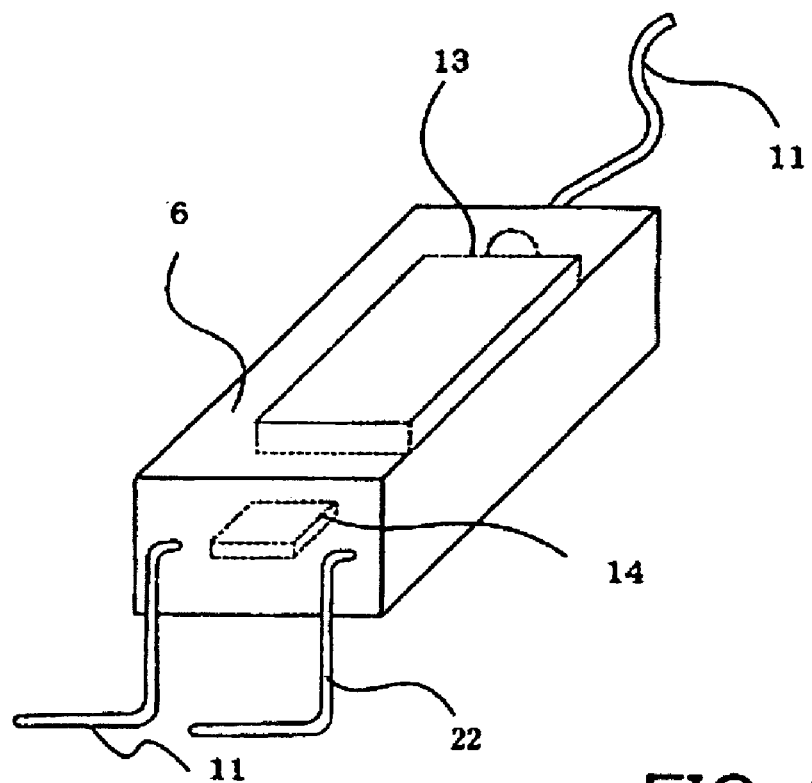
FIG. 3B is a perspective view of a serial transducer thereof.

FIG. 3A shows an embodiment of the sensor head 6 for detecting the linear scale 5, and FIG. 3B shows a modification of the embodiment. In FIGS. 3A and 3B, the reference numeral "13" denotes a serial converter having a serial signal converter circuit, and "14" denotes a memory IC.

The sensor head 6 has a built-in serial converter 13 for converting signals, such as, e.g., a linear motor magnetic pole detection signal and a scale signal, into a serial signal. Furthermore, the sensor head 6 has a memory 14 for storing the motor parameter of the linear motor. When this moving magnet type linear slider and the driver 12 are connected, it is configured such that the motor parameter is inputted into the memory 14, converted into a serial signal by the serial converter (serial converter circuit) 13 and then transmitted to the driver 12.

Next, the operation of this moving magnet type linear slider will be explained.

As shown in FIGS. 1 and 2, in this moving magnet type linear slider, when a power is supplied from an external power source (not illustrated) to the armature 2 of the linear motor, the table 3 is reciprocated with respect to the fixed base 1 on the guide rails 8 along the longitudinal direction thereof. The sensor head 6 is provided at the fixed base 1 while the linear scale 5 is provided at the table 3, and therefore the sensor head 6 detects the relative position of the table 3 and the fixed base 1. When the sensor head 6 detects the relative position, the serial converter (serial converter circuit) 13 mounted in the sensor head 6 as shown in FIG. 3 performs a serial conversion of the linear scale signal, the magnetic pole signal, the motor parameter stored in the memory IC 14, and the converted serial signal will be transmitted to the driver 12. Based on the signal and the motor parameter transmitted to the driver 12, high precision positioning of the linear motor is performed by the driver 12. This structure enables large-capacity transmission as compared with a conventional pulse transmission, resulting in a high-speed and high-positioning resolution linear driving system. Furthermore, the minimum positioning resolution can be improved ten (10) times higher than that of a conventional pulse train transmission.

In the aforementioned moving magnet type linear slider of this embodiment of the present invention, the linear motor of a suction force offset type in which the field permanent magnets 4 are placed opposite to both side surfaces of the armature 2 provided on the fixed base 1 via gaps is employed and that the linear scale 5 is arranged on the thrust central axis G-G of the armature 2. Therefore, the effect of vibration to a sensor signal due to the effect of microvibration at the time of driving the table 3 can be minimized, resulting in improved servo gain and suppressed speed ripple. As a result, the positioning performance and the constant feeding performance of a device mounting the linear slider can be improved.

Furthermore, since all of wire leads, such as, e.g., the motor lead 10 and the linear scale cable lead 11, can be placed at the side of the fixed base 1, cable bear can be eliminated in contrast to a moving coil type linear slider.

Figure 4:
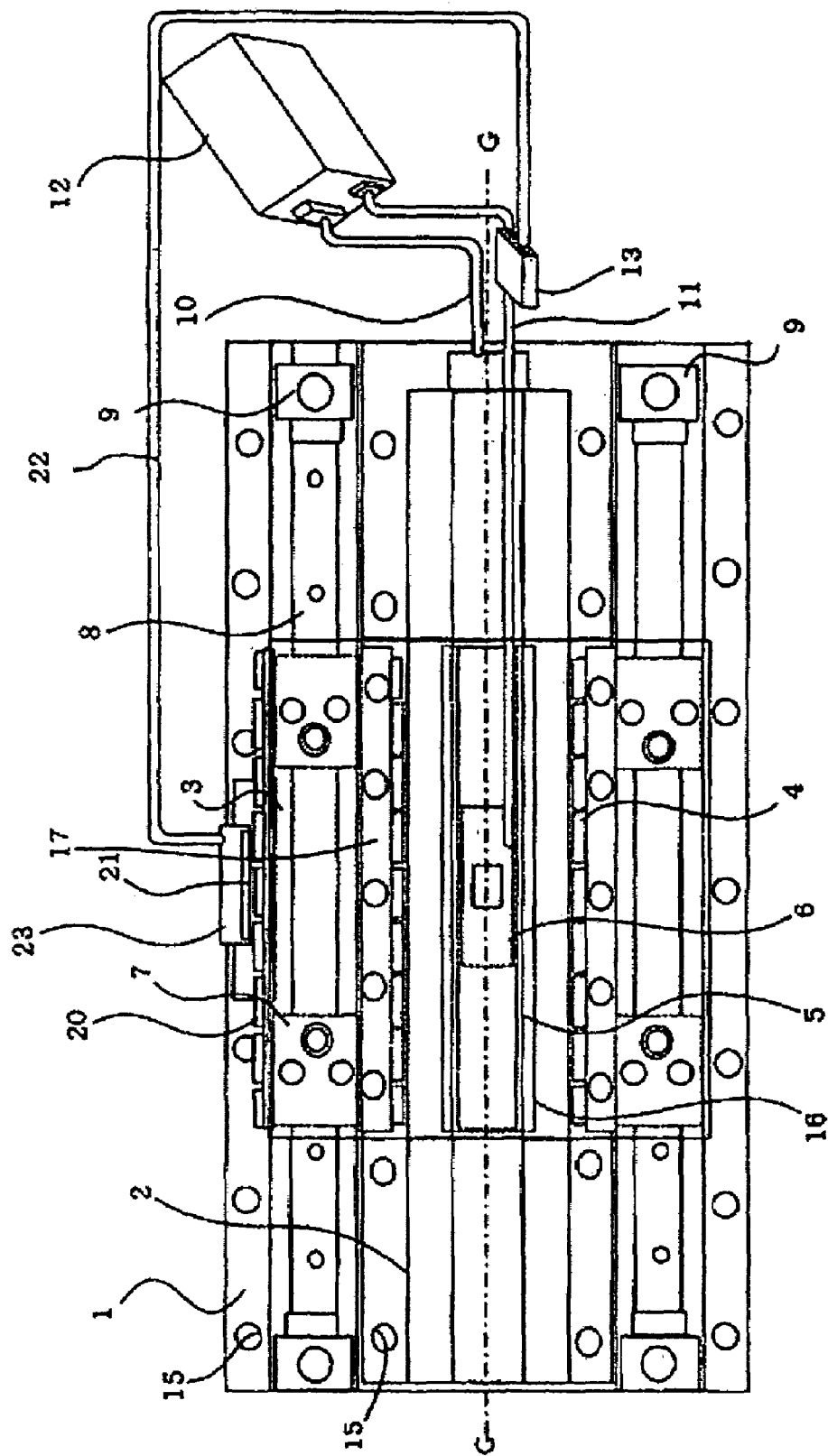
FIG. 4 is a plan view of a moving magnet type linear slider according to another embodiment of the present invention.
Figure 5:
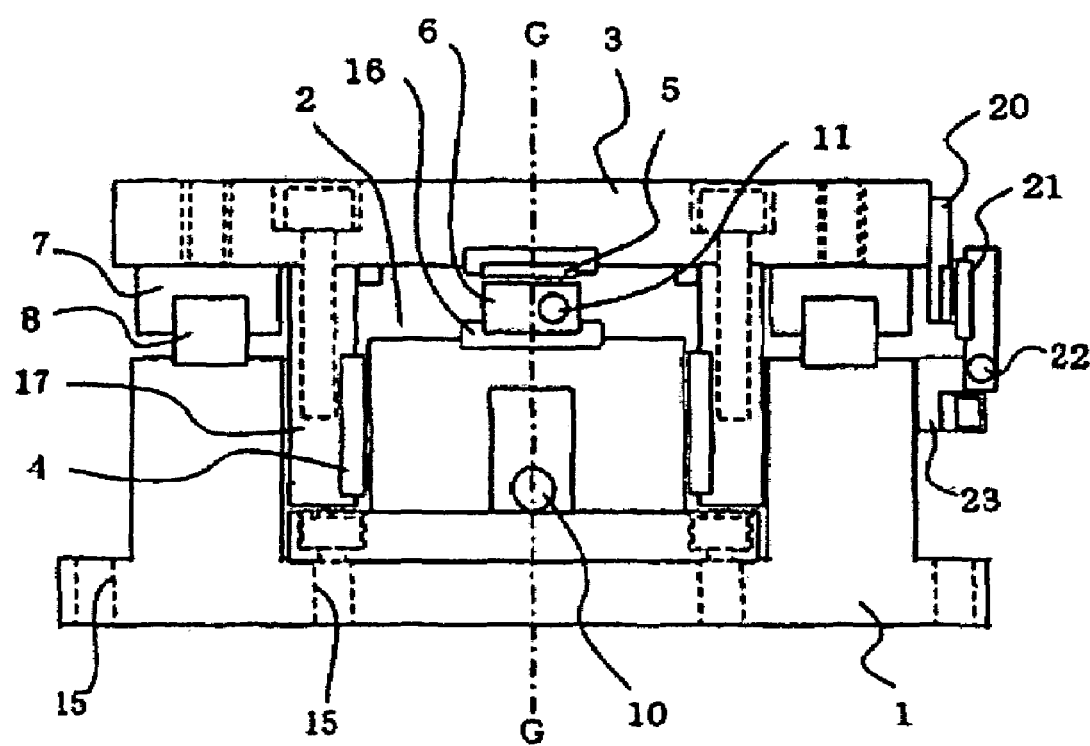
FIG. 5 is a side view of the linear slider shown in FIG. 4.
Figure 6:
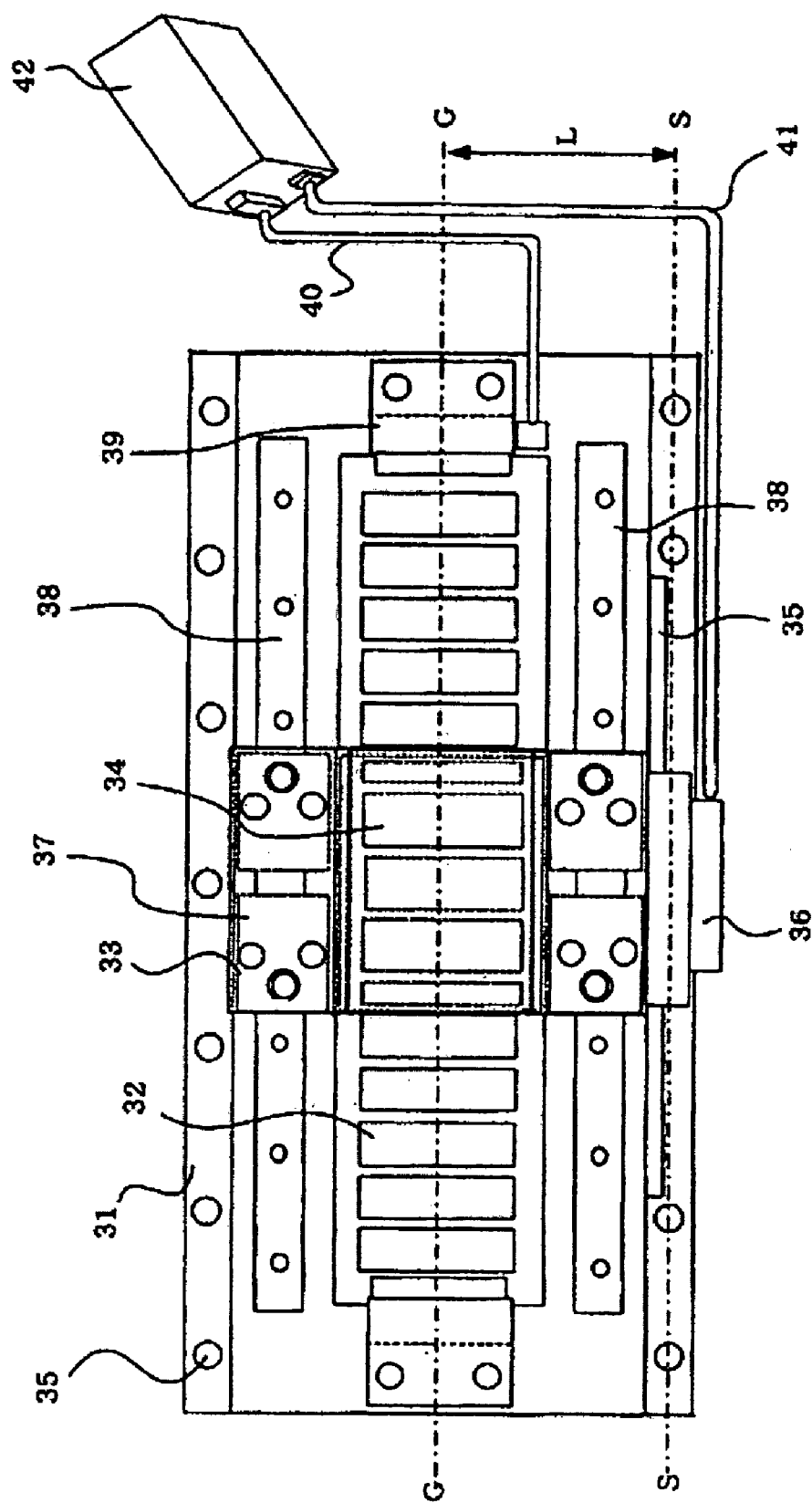
FIG. 6 is a plan view of a conventional moving magnet type linear slider.
Figure 7:
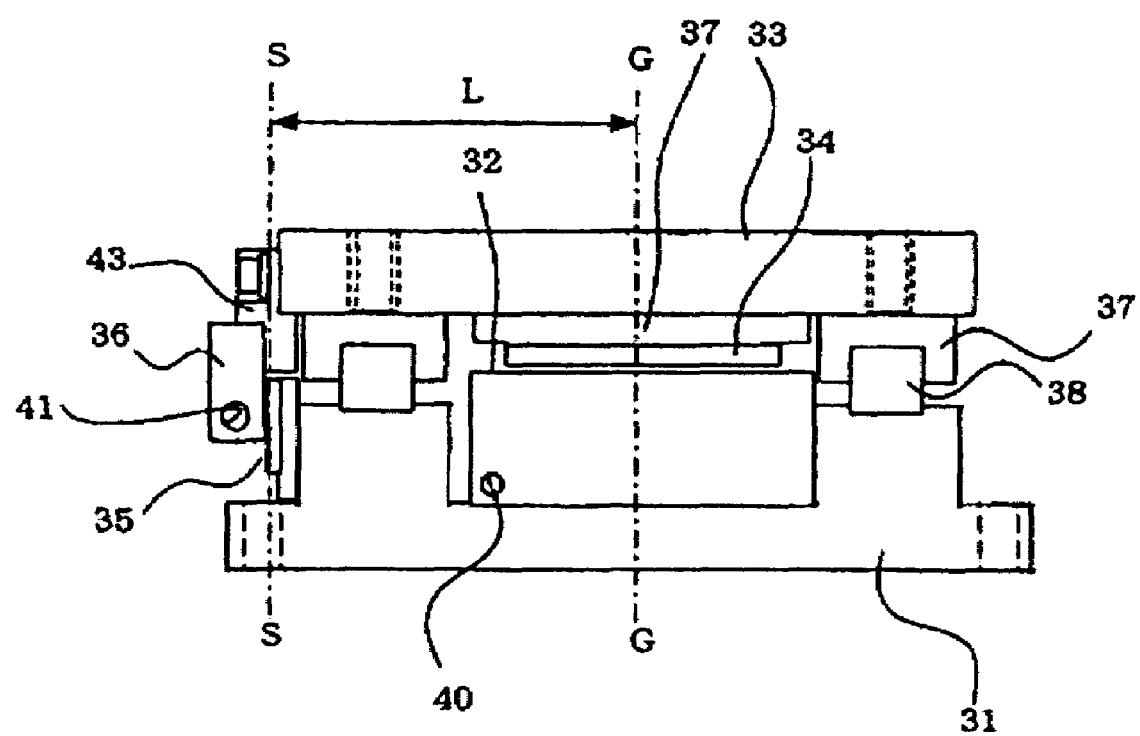
FIG. 7 is a side view of the linear slider shown in FIG. 6.

FIG. 4 is a plan view of a moving magnet type linear slider according to another embodiment of the present invention, and FIG. 5 is a side view of the linear slider shown in FIG. 4.

In FIGS. 4 and 5, the reference numeral "20" denotes a magnetic pole detector magnet, "21" denotes a magnetic pole detector head, "22" denotes a magnetic pole detector lead, and "23" denotes a magnetic pole detector holder.

This embodiment differs from the first embodiment in that the magnetic pole detector for detecting the relative position of the armature 2 and the field permanent magnet 4 is secured to the side surface of the right or left linear guide and that the hall element which is one of elements of the magnetic pole detector is secured to the fixed base side 1 and the permanent magnet 20 which is the other element of the magnet pole detector is secured to the side of the table 3 with the same pitch as that of the field permanent magnets 4. The remaining structure of this embodiment is the same as in the first embodiment. Accordingly, the cumulative explanation will be omitted by allotting the same reference numeral as in the first embodiment to the corresponding portion of the second embodiment.

In this second embodiment, the magnetic pole detection signal detected by the magnetic pole detector head 21 as well as the scale signal outputted from the sensor head 6 of the linear scale 5 are converted into a serial signal by the serial converter 13 and transmitted to the driver 12.

In this embodiment, since the magnetic pole detector for performing the initial magnetic pole detection is provided at the side of the slider contrary to the linear scale side and the detecting side (hall element) is secured to the fixed base 1 and the magnet pole detector magnet 20 is secured to the table 1, the relative position of the linear motor armature 2 and the field permanent magnet 4 can be detected immediately upon turning on the servo, resulting in simplified setup.

In the linear scale 5 mentioned in this embodiment, it is preferable to use a linear scale mounting an absolute-type encoder which detects an absolute position signal of a movable unit. In this case, a linear slider simple in operation, which does not require a return-to-origin operation at the time of the power activation, can be provided.

According to the present invention, the structure not having any member with lead wires at the moving side enables high-tact (frequency) operation. Therefore, the present invention can be applied to, for example, a bonder for use in semiconductor component manufacturing machine high in driving duty. Taking advantage of the constant and smooth feeding speed, it also can be applied to a feed shaft for high precision processing machine.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

I claim:

1. A moving magnet type linear slider, comprising:
    linear guides including sliders for movably supporting right and left sides of a table placed opposite to a fixed base in parallel and guide rails for guiding the sliders;
    a linear motor for reciprocating the table with respect to the fixed base on the guide rails along a longitudinal direction thereof; and
    a detector for detecting a relative position between the table and the fixed base,
    wherein the linear motor includes armatures each having a polyphase armature winding wound around an armature core served as a magnetic circuit and secured to a center of the fixed base, and field permanent magnets each secured to a lower surface of the table in a vertical direction and arranged between an inner side surface of each of linear guides arranged at right and left sides of the table and an outer side surface of the armature via gaps, the linear motor being a suction force offset type,
    wherein the detector includes a linear scale secured to a lower surface side of the table, and a sensor head secured to an upper surface side of the armature to detect the linear scale, and
    wherein a central axis of the detector constituted by the linear scale and the sensor head is substantially aligned with a thrust central axis of the armature.

2. The moving magnet type linear slider as recited in claim 1, further comprising a magnetic pole detector for detecting a relative position of the armature and the field permanent magnet arranged at one of side surface sides of the right and left linear guides, wherein a hall element constituting the magnetic pole detector is secured to the fixed base side and magnetic pole detector permanent magnets constituting the magnetic pole detector are secured to the table side with the same pitch as that of the field permanent magnets.

3. The moving magnet type linear slider as recited in claim 2, wherein a magnetic pole detection signal detected by the hall element and a linear scale signal detected by the sensor head are introduced into the same serial converter so that both the signals are converted into a serial signal and transmitted to a driver.

4. The moving magnet type linear slider as recited in claim 3, wherein the serial converter is built in the sensor head.

5. The moving magnet type linear slider as recited in claim 3, wherein a memory is provided at one of the sensor head and the serial converter, wherein a motor parameter of the linear motor is inputted into the memory, and wherein when the linear slider and the driver are connected, the motor parameter is also converted into a serial signal by the serial converter, and the serial signal is transmitted to the driver.

6. The moving magnet type linear slider as recited in claim 4, wherein a memory is provided at one of the sensor head and the serial converter, wherein a motor parameter of the linear motor is inputted into the memory, and wherein when the linear slider and the driver are connected, the motor parameter is also converted into a serial signal by the serial converter, and the serial signal is transmitted to the driver.

7. The moving magnet type linear slider as recited in claim 1, wherein an absolute-type encoder for detecting an absolute position signal of a movable unit of the linear motor is mounted in the linear scale.

8. The moving magnet type linear slider as recited in claim 1, wherein the fixed base is provided with an attachment hole for attaching the linear slider to an external device, the attachment hole being located outside or inside the guide rail.

9. A moving magnet type linear slider, comprising:
    a fixed base;
    a table arranged above the fixed base;
    a linear guide for slidably supporting the table, the linear guide including a slider secured to the table and a guide rail for guiding the slider, the guide rail being secured to the fixed base;

a linear motor for reciprocating the table with respect to the fixed base on the guide rail along a longitudinal direction thereof; and a detector for detecting a relative position between the table and the fixed base, wherein the linear motor includes armatures secured to a center of the fixed base and field permanent magnets secured to a lower surface of the table and arranged between the linear guide and the armature via gaps so as to offset a suction force thereof, wherein the detector includes a linear scale secured to a lower surface side of the table and a sensor head secured to an upper surface side of the armature to detect the linear scale, and wherein a central axis of the detector is substantially aligned with a thrust central axis of the armature.

10. The moving magnet type linear slider as recited in claim 9, wherein the field permanent magnets are secured to a side surface of a magnetic yoke downwardly extended from the table.

11. The moving magnet type linear slider as recited in claim 9, wherein a pair of linear guides are provided at right and left sides of the table.

12. The moving magnet type linear slider as recited in claim 11, further comprising a magnetic pole detector for detecting a relative position of the armature and the field permanent magnet arranged at one of side surface sides of the right and left linear guides, wherein a hall element constituting the magnetic pole detector is secured to the fixed base and magnetic pole detector permanent magnets constituting the magnetic pole detector are secured to the table with the same pitch as that of the field permanent magnets.

13. The moving magnet type linear slider as recited in claim 12, wherein a magnetic pole detection signal detected by the hall element and a linear scale signal detected by the sensor head are introduced into the same serial converter so that both the signals are converted into a serial signal and transmitted to a driver.

14. The moving magnet type linear slider as recited in claim 13, wherein the serial converter is built in the sensor head.

15. The moving magnet type linear slider as recited in claim 13, wherein a memory is provided at one of the sensor head and the serial converter, wherein a motor parameter of the linear motor is inputted into the memory, and wherein when the linear slider and the driver are connected, the motor parameter is also converted into a serial signal by the serial converter, and the serial signal is transmitted to the driver.

16. The moving magnet type linear slider as recited in claim 14, wherein a memory is provided at one of the sensor head and the serial converter, wherein a motor parameter of the linear motor is inputted into the memory, and wherein when the linear slider and the driver are connected, the motor parameter is also converted into a serial signal by the serial converter, and the serial signal is transmitted to the driver.

17. The moving magnet type linear slider as recited in claim 9, wherein an absolute-type encoder for detecting an absolute position signal of a movable unit of the linear motor is mounted in the linear scale.

18. The moving magnet type linear slider as recited in claim 9, wherein the fixed base is provided with an attachment hole for attaching the linear slider to an external device, the attachment hole being located outside or inside the guide rail.

* * * * *